(12) United States Patent
Ohmori et al.

(10) Patent No.: US 10,535,882 B2
(45) Date of Patent: *Jan. 14, 2020

(54) FUEL CELL

(71) Applicant: NGK INSULATORS, LTD., Nagoya-shi, Aichi (JP)

(72) Inventors: Makoto Ohmori, Nagoya (JP); Shinji Fujisaki, Kuwana (JP)

(73) Assignee: NGK INSULATORS, LTD., Nagoya-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,949

(22) Filed: Jan. 12, 2018

(65) Prior Publication Data

US 2018/0138521 A1 May 17, 2018

Related U.S. Application Data

(63) Continuation of application No. PCT/JP2017/027081, filed on Jul. 26, 2017.

(30) Foreign Application Priority Data

Jul. 27, 2016 (JP) .................. 2016-147858

(51) Int. Cl.
*H01M 8/1213* (2016.01)
*H01M 4/90* (2006.01)
*H01M 4/02* (2006.01)

(52) U.S. Cl.
CPC ....... *H01M 4/9033* (2013.01); *H01M 8/1213* (2013.01); *C01P 2002/34* (2013.01); *H01M 2004/027* (2013.01)

(58) Field of Classification Search
None
See application file for complete search history.

(56) References Cited

U.S. PATENT DOCUMENTS

2007/0111069 A1* 5/2007 Rehg ............... C04B 37/005
429/465
2010/0015473 A1* 1/2010 Hendriksen ......... H01M 8/2425
429/486

(Continued)

FOREIGN PATENT DOCUMENTS

JP 2006-032132 A 2/2006
JP 2014-129185 A 7/2014

(Continued)

OTHER PUBLICATIONS

English-language International Search Report for PCT/JP2017/027081 (1 pg).

(Continued)

*Primary Examiner* — Tracy M Dove
(74) *Attorney, Agent, or Firm* — Flynn Thiel, P.C.

(57) ABSTRACT

A fuel cell has an anode, a cathode, and a solid electrolyte layer. The cathode contains a main component containing a perovskite oxide which is expressed by the general formula $ABO_3$ and includes at least one of La and Sr at the A site. The solid electrolyte layer is disposed between the anode and the cathode. The cathode includes an interface region that is within 5 μm from a surface near to the solid electrolyte layer. The interface region contains a main phase containing the perovskite oxide, and a secondary phase containing strontium oxide. An occupied surface area ratio of the secondary phase in a cross section of the interface region is greater than or equal 0.05% and less than or equal to 3%.

2 Claims, 3 Drawing Sheets

(56) References Cited

U.S. PATENT DOCUMENTS

| | | | |
|---|---|---|---|
| 2013/0244132 A1* | 9/2013 | Ohmori | B01J 23/002 |
| | | | 429/482 |
| 2014/0272622 A1* | 9/2014 | Xing | H01M 4/9033 |
| | | | 429/410 |
| 2015/0024302 A1 | 1/2015 | Kobayashi et al. | |
| 2015/0263355 A1* | 9/2015 | Hiraiwa | H01M 8/0232 |
| | | | 429/434 |
| 2016/0079590 A1* | 3/2016 | Roev | H01M 12/08 |
| | | | 429/405 |

FOREIGN PATENT DOCUMENTS

| | | |
|---|---|---|
| JP | 2014-199807 A | 10/2014 |
| JP | 2015-038858 A | 2/2015 |

OTHER PUBLICATIONS

International Search Report for PCT/JP2017/027081, dated Oct. 3, 2017 (4 pgs).
English translation of International Preliminary Report on Patentability issued in PCT/JP2017/027081, dated Feb. 7, 2019 (2 pgs.).
English translation of Written Opinion of the International Searching Authority issued in PCT/JP2017/027081, dated Oct. 3, 2017 (3 pgs.).

\* cited by examiner

FUEL CELL

CROSS-REFERENCE TO RELATED APPLICATIONS

This application is a continuation application of PCT/JP2017/027081, filed Jul. 26, 2017, which claims priority to Japanese Application No. 2016-147858, filed Jul. 27, 2016, the entire contents all of which are incorporated herein by reference.

TECHNICAL FIELD

The present invention relates to a fuel cell.

BACKGROUND ART

A typical fuel cell is known to include an anode, a cathode, and a solid electrolyte layer disposed between the anode and the cathode.

The material used in the cathode is suitably a perovskite oxide expressed by the general formula $ABO_3$ and including at least one of La and Sr at the A site (For example, reference is made to Japanese Patent Application Laid-Open No. 2006-32132).

SUMMARY OF INVENTION

Technical Problem

However, the fuel cell output may be reduced by repetition of power generation. The present inventors have gained the new insight that one cause of a reduction in output is deterioration of the cathode which is related to the proportion of strontium oxide that is present in a region of the cathode near to the solid electrolyte layer.

The present invention is proposed based on the new insight above, and has the object of providing a fuel cell that inhibits a reduction in output.

Solution to Problem

The fuel cell according to the present invention has an anode, a cathode, and a solid electrolyte layer. The cathode contains a main component configured by a perovskite oxide which is expressed by the general formula $ABO_3$ and includes at least one of La and Sr at the A site. The solid electrolyte layer is disposed between the anode and the cathode. The cathode includes an interface region that is within 5 μm from a surface near to the solid electrolyte layer. The interface region contains a main phase configured by the perovskite oxide, and a secondary phase configured by strontium oxide. An occupied surface area ratio of the secondary phase in a cross section of the interface region is greater than or equal 0.05% and less than or equal to 3%.

Advantageous Effects of Invention

The present invention provides a fuel cell that inhibits a reduction in output.

DESCRIPTION OF EMBODIMENTS

Figure 1:
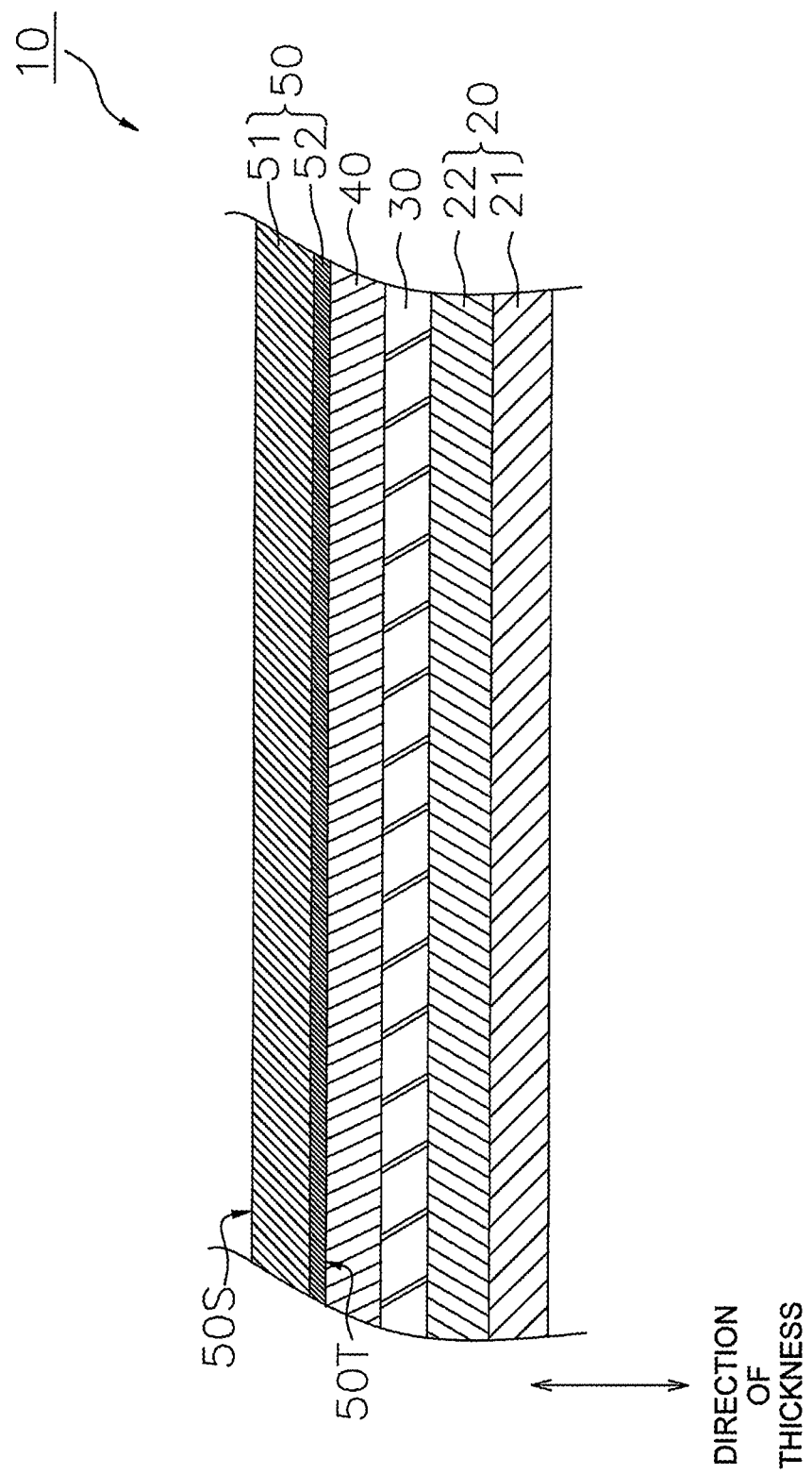
FIG. 1 is a cross sectional view illustrating a configuration of a fuel cell.

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ.

Configuration of Fuel Cell 10

The configuration of a fuel cell 10 will be described making reference to the drawings. The fuel cell 10 is configured as a so-called solid oxide fuel cell (SOFC). The possible configurations of the fuel cell 10 include a flat-tubular type, a segmented-in-series type, an anode-supporting type, an electrolyte flat-plate type, a cylindrical type, or the like.

FIG. 1 is a cross sectional view illustrating a configuration of a fuel cell 10. The fuel cell 10 includes an anode 20, a solid electrolyte layer 30, a barrier layer 40 and a cathode 50.

The anode 20 functions as the anode for the fuel cell 10. As illustrated in FIG. 1, the anode 20 includes an anode current collector 21 and an anode active layer 22.

The anode current collector 21 is configured as a porous body that exhibits superior gas permeability. The constituent material comprising the anode current collector 21 includes a material that is used in the anode current collector of a conventional SOFC, and for example, includes NiO (nickel oxide)-8YSZ (8 mol % of yttria-stabilized zirconia), or NiO—$Y_2O_3$ (yttria). When NiO is included in the anode current collector 21, at least a portion of the NiO may be reduced to Ni during operation of the fuel cell 10. The thickness of the anode current collector 21 may be, for example, 0.1 mm to 5.0 mm.

The anode active layer 22 is disposed on the anode current collector 21. The anode active layer 22 is configured as a porous body that is denser than the anode current collector 21. The constituent material for the anode active layer 22 includes a material used in an anode active layer of a conventional SOFC, and for example, includes NiO-8YSZ. When NiO is included in the anode active layer 22, at least a portion of the NiO may be reduced to Ni during operation of the fuel cell 10. The thickness of the anode active layer 22 may be, for example, 5.0 μm to 30 μm.

The solid electrolyte layer 30 is disposed between the anode 20 and the cathode 50. The solid electrolyte layer 30 in the present embodiment is sandwiched between the anode 20 and the barrier layer 40. The solid electrolyte layer 30 functions to enable permeation of oxygen ions that are produced by the cathode 50. The solid electrolyte layer 30 is denser than the anode 20 and the cathode 50.

The solid electrolyte layer 30 may contain $ZrO_2$ (zirconia) as a main component. In addition to zirconia, the solid electrolyte layer 30 may contain an additive such as $Y_2O_3$ (yttria) and/or $Sc_2O_3$ (scandium oxide). These additives function as a stabilizing agent. The mol composition ratio (stabilizing agent:zirconia) of the stabilizing agent to zirconia in the solid electrolyte layer 30 may be approximately 3:97~20:80. Therefore, the material used in the solid electrolyte layer 30 includes 3YSZ, 8YSZ, 10YSZ, or ScSZ (zirconia stabilized with scandia), or the like. The thickness of the solid electrolyte layer 30, for example, may be 3 μm to 30 μm.

In the present embodiment, the term "composition X contains as a main component composition Y" means that composition Y preferably occupies at least 70 wt % of the total of composition X, and more preferably occupies at least 90 wt %.

The barrier layer 40 is disposed between the solid electrolyte layer 30 and the cathode 50. The barrier layer 40 inhibits the formation of a high resistivity layer between the solid electrolyte layer 30 and the cathode 50. The barrier layer 40 is denser than the anode 20 or the cathode 50. The barrier layer 40 may include a main component of a ceria-based material such as GDC (gadolinium-doped ceria), SDC (samarium-doped ceria), or the like. The thickness of the barrier layer 40 may be, for example, 3 μm to 20 μm.

The cathode 50 is disposed on the barrier layer 40. The cathode 50 functions as a cathode for the fuel cell 10. The cathode 50 is a porous body. The cathode 50 contains a perovskite oxide as a main component. The perovskite oxide is expressed by the general formula $ABO_3$ and includes at least one of La and Sr at the A site. This type of perovskite oxide includes (La, Sr)(Co, Fe)$O_3$: (lanthanum strontium cobalt ferrite), (La, Sr) Fe$O_3$: (lanthanum strontium ferrite), (La, Sr)Co$O_3$: (lanthanum strontium cobaltite), La(Ni, Fe)$O_3$:(lanthanum nickel ferrite), (La, Sr) Mn$O_3$: (lanthanum strontium manganate), or the like. However there is no limitation in this regard.

The content ratio of the perovskite oxide in the cathode 50 is greater than or equal to 70 wt %. The content ratio of the perovskite oxide in the cathode 50 is preferably greater than or equal to 90 wt %.

The cathode 50 has a first surface 50S and a second surface 50T. The first surface 50S is a surface that is opposite to the solid electrolyte layer 30. The second surface 50T is the surface that is near to the solid electrolyte layer 30. In the present embodiment, since the fuel cell 10 includes the barrier layer 40, the cathode 50 makes contact with the barrier layer 40 at the second surface 50T. That is to say, in the present embodiment, the second surface 50T is the interface between the cathode 50 and the barrier layer 40.

Configuration of Cathode 50

The cathode 50 includes a surface region 51 and an interface region 52.

The surface region 51 is the region of the cathode 50 on the opposite side to the solid electrolyte layer 30. The surface region 51 is a region that is separated by 5 μm from the solid electrolyte layer 30 in the cathode 50. The surface region 51 is a region that excludes the interface region 52 in the cathode 50. Although there is no particular limitation, the thickness of the surface region 51 may be 5 μm to 300 μm.

The interface region 52 is the region on the opposite side to the solid electrolyte layer 30 side of the cathode 50. The interface region 52 is a region that is within 5 μm from the second surface 50T in the cathode 50. The interface region 52 is within 5 μm from the barrier layer 40. The thickness of the interface region 52 is 5 μm. The interface region is a region that excludes the surface region 51 of the cathode 50.

The second surface 50T may be determined based on a line of rapid change in the concentration of an element contained only in the cathode 50 when mapping the component concentration in a cross section that is parallel to the direction of thickness. More specifically, the second surface 50T is taken to be the line at which the concentration of an element that is substantially only included in the cathode 50 takes a value of 10% of the maximum concentration of that component.

The interface region 52 contains a main component of a perovskite oxide expressed by the general formula $ABO_3$ and including at least one of La and Sr at the A site. The occupied surface area ratio of the main phase that contains the perovskite oxide in the cross section of the interface region 52 may be greater than or equal to 97% and less than or equal to 99.5%.

The interface region 52 contains strontium oxide (SrO) as a secondary component. The occupied surface area ratio of the secondary phase configured by SrO in the cross section of the interface region 52 is greater than or equal to 0.05% and less than or equal to 3%. Since there is a reduction in the inactive portion in the interface region 52 as a result of the feature that the occupied surface area ratio of the secondary phase is less than or equal to 3%, it is possible to inhibit the progression of deterioration of the interface region 52 during the passage of an electrical current that is caused by a reaction between the secondary phase and the main phase. Furthermore, since the improvement to sintering characteristics of the interface region 52 results in a strengthening of the backbone of the porous structure due to the feature that the occupied surface area ratio of the secondary phase is greater than or equal to 0.05%, it is possible to inhibit changes to the microstructure of the interface region 52 during the passage of an electrical current. As a result of the above features, the durability of the cathode 50 can be improved.

In the present embodiment, the term "occupied surface area ratio of the substance Z in the cross section" denotes the ratio of the sum total surface area of a substance Z relative to the total surface area of the solid phase in the cross section. The method of calculating the occupied surface area ratio will be described below.

The average equivalent circle diameter of the secondary phase in the cross section of the interface region 52 is preferably greater than or equal to 10 nm and less than or equal to 500 nm. In this manner, it is possible to further reduce the deterioration rate of the interface region 52. The equivalent circle diameter is the diameter of a circle that has the same surface area as the secondary phase in an analysis image that analyzed a field emission—scanning electron microscope (FE-SEM) image described below. The average equivalent circle diameter is the value of the arithmetic average of 50 equivalent circle diameters for the secondary phase that are randomly selected. The 50 secondary phase samples that are the object of equivalent circle diameter measurement are preferably selected in an arbitrary manner from 5 or more positions on an FE-SEM image (magnification 10,000 times) in a cross section of the interface region 52.

The constituent elements (for example, La, Co, or the like) in the main phase may be in a solid solution in the secondary phase. Furthermore, the secondary phase may include a minute amount of impurities in addition to SrO.

In addition to the main phase and the secondary phase, the interface region 52 may include a third phase containing a perovskite oxide that is expressed by the general formula $ABO_3$ and that is different from that used in the main phase or contains an oxide of the constituent elements of the main phase or the like. The oxide of the constituent elements of the main phase includes for example (Co, Fe)$_3O_4$, and Co$_3O_4$ or the like. (Co, Fe)$_3O_4$ includes Co$_2$FeO$_4$, Co$_{1.5}$Fe$_{1.5}$O$_4$, and CoFe$_2$O$_4$ or the like.

The occupied surface area ratio of the third phase in the cross section of the interface region 52 may be less than or equal to 10%. In this manner, it is possible to not only inhibit microscopic cracks after firing but also after heat cycle testing. The heat cycle testing includes maintaining a reducing atmosphere by supply to the anode of Ar gas and hydrogen gas (4% relative to Ar) and repeats a cycle ten times in which after increasing the temperature over 2 hours from ambient temperature to 800° C., the temperature is allowed to fall to ambient temperature over 4 hours.

The surface region 51 contains a main phase of a perovskite oxide including at least Sr at the A site and that is expressed by the general formula $ABO_3$. The occupied surface area ratio of the main phase in the cross section of the surface region 51 may be greater than or equal to 95%. The surface region 51 may or may not include a secondary phase that comprises SrO. It has been experimentally confirmed that an effective result is obtained by limiting the occupied surface area ratio of the secondary phase in a cross section of the interface region 52 as discussed above to a predetermined range without reference to the presence or absence of a secondary phase in the cross section of the surface region 51 or the dimension of the occupied surface area ratio of the secondary phase in a cross section of the surface region 51. In addition to the main phase, the surface region 51 may include a third phase that is comprises the perovskite oxide as discussed above or an oxide of the constituent elements of the main phase.

Method of Calculation of Occupied Surface Area

The method of calculation of the occupied surface area ratio of the secondary phase in a cross section of the interface region 52 will be described below making reference to the figures. In the following description, although a method of calculation of the occupied surface area ratio of the secondary phase will be described, the occupied surface area ratio of the main phase or the third phase may be calculated in the same manner.

(1) Backscattered Electron Image

Figure 2:
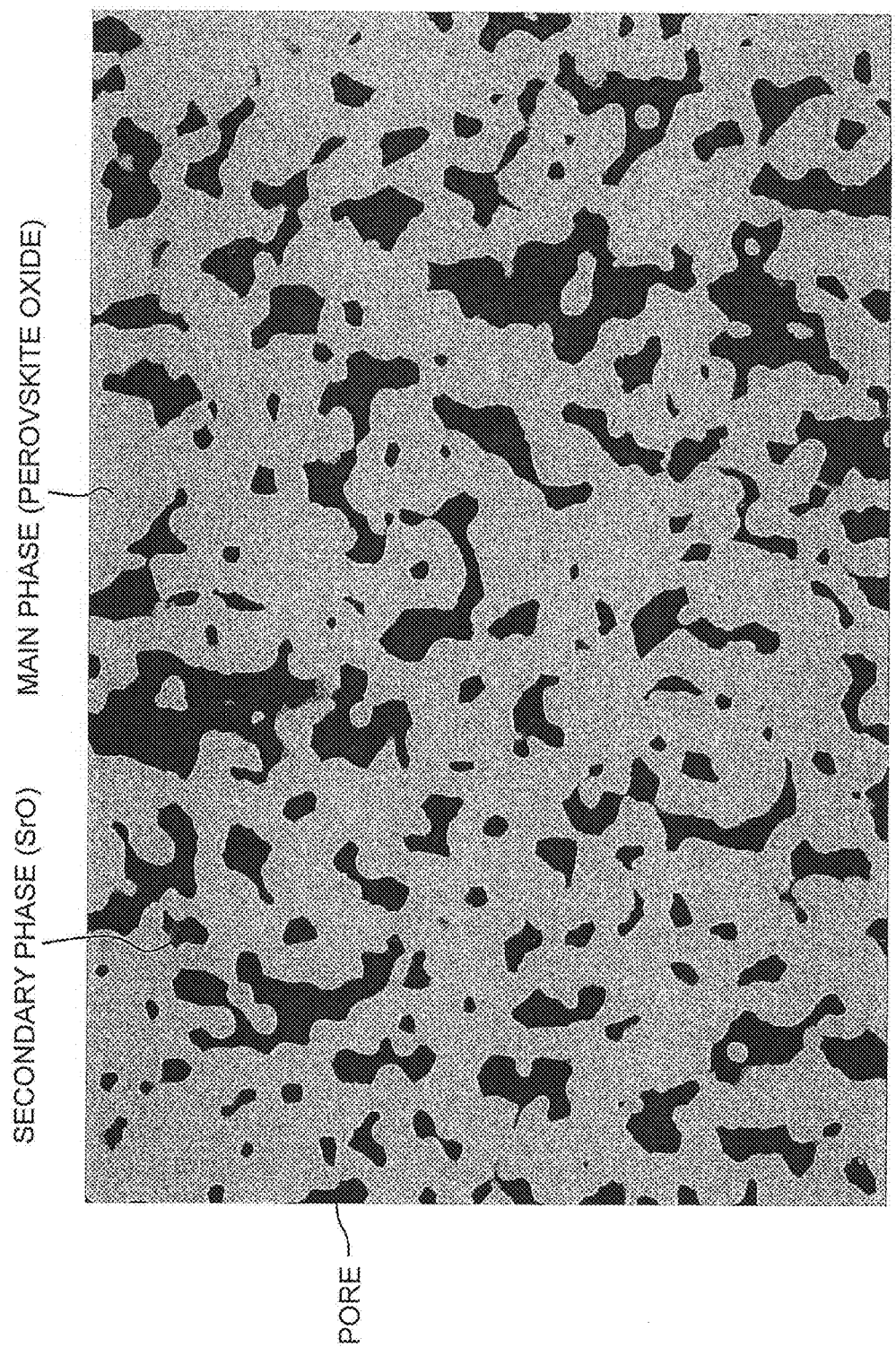
FIG. 2 is an electron backscattered image of a cross section of the interface region.

FIG. 2 is an example of a backscattered electron image illustrating a cross section of the interface region 52 that is enlarged with a magnification of 10,000 times by an FE-SEM using a backscattered electron detector. FIG. 2 shows a cross section of the cathode 50 that contains (La, Sr)(Co, Fe)$O_3$ as a main component. The backscattered electron image in FIG. 2 is obtained by an FE-SEM (model: ULTRA55) manufactured by Zeiss AG (Germany) with a working distance of 2 mm, and an acceleration voltage of 1.5 kV. The cross section of the interface region 52 is preprocessed by polishing with precision machinery followed by an ion milling process performed using an IM4000 manufactured by Hitachi High-Technologies Corporation.

In the backscattered electron image shown in FIG. 2, there are different contrasts for the main phase (La, Sr)(Co, Fe)$O_3$, the secondary phase (SrO) and the pores. The main phase is displayed as "faint gray", the secondary phase as "gray" and the pores as "black". In this manner, 3 values assigned in relation to the contrast can be realized by categorizing the luminosity of the image into 256 gradations. The contrast in the backscattered electron image enables identification of the main phase, the secondary phase and the pores.

(2) Analysis of Backscattered Electron Image

Figure 3:
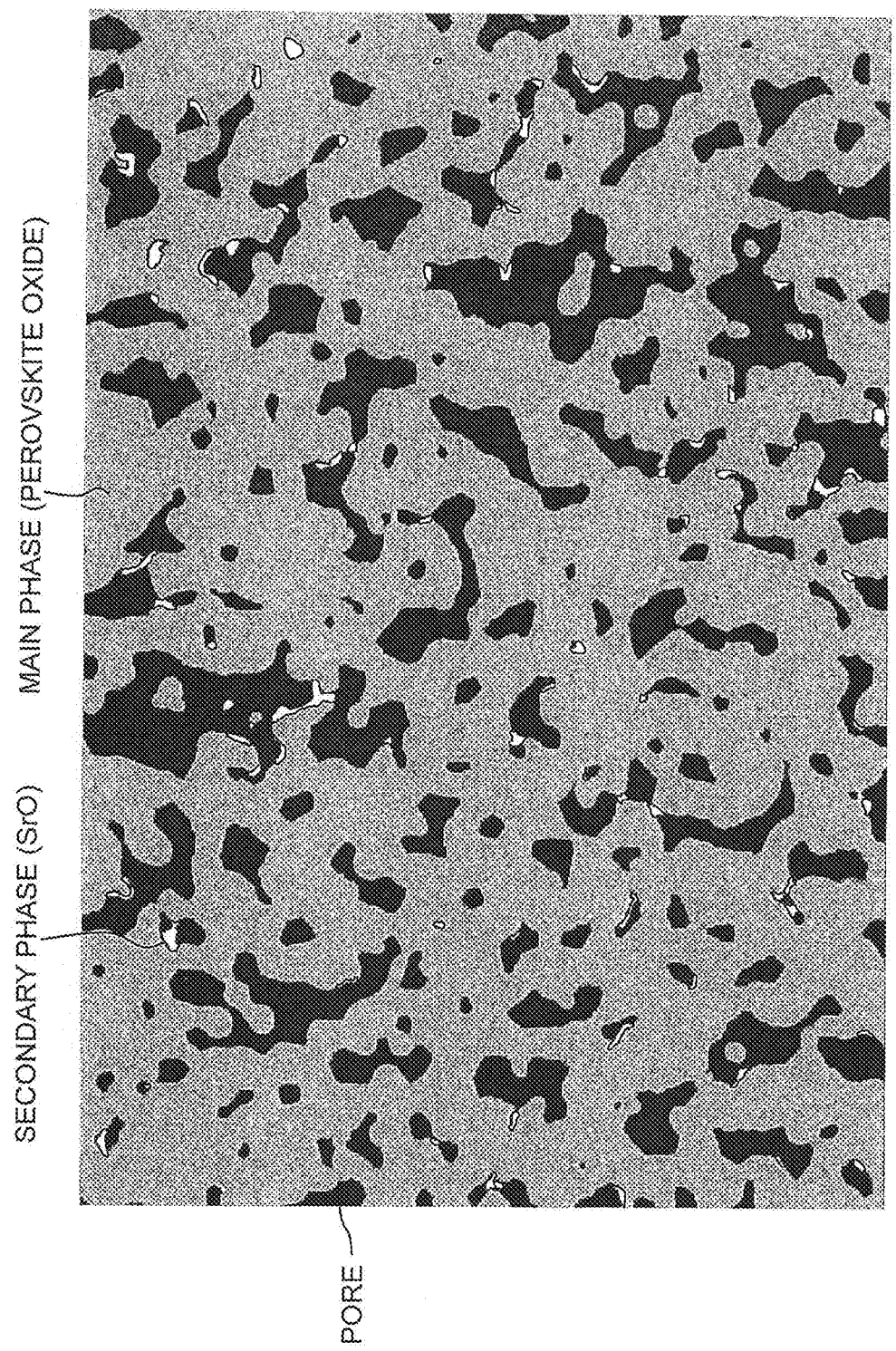
FIG. 3 illustrate the image analysis results of FIG. 2.

FIG. 3 shows the results of image analysis in relation to EDX analysis results and the backscattered electron image shown in FIG. 2 using HALCON image analysis software produced by MVTec GmbH (Germany). FIG. 3 shows the secondary phase as white enclosed by a solid black line.

(3) Calculation of Occupied Surface Area

The total surface area of the secondary phase in the white areas is calculated with reference to the analysis image shown in FIG. 3. Next, the proportion of the total surface area of the secondary phase relative to the total surface area of all the solid phase in the backscattered electron image is calculated. This type of analysis is performed at five positions on the same cross section of the interface region 52, and the value of the arithmetic average of the proportion of the total surface area of the secondary phase calculated respectively at five positions is taken to be the occupied surface area ratio of the secondary phase in the interface region 52.

Material of Interface Region 52

The cathode material used to configure the interface region 52 is a mixture including a main component comprising a perovskite oxide and a secondary component of SrO. SrO may be configured as a mixture of strontium carbonate, strontium hydroxide or strontium nitrate.

It is possible to adjust the occupied surface area ratio of the secondary phase in the interface region 52 by adjusting the addition amount of the material powder that contains SrO.

Adjusting the particle size of the material powder containing SrO enables an adjustment of the average equivalent circle diameter of the secondary phase of the interface region 52. An accurate classification that includes an upper limiting value and a lower limiting value of the particle diameter is possible by use of an air classifier to adjust the particle size of the material powder containing SrO. When the particle size of the material powder containing SrO is configured to be coarse, the average equivalent circle diameter of the secondary phase can be configured to be large, and conversely, when the particle size is configured to be fine, the average equivalent circle diameter of the secondary phase can be configured to be small. Furthermore when the particle size distribution of the material powder containing SrO is configured to be large, the average equivalent circle diameter of the secondary phase can be configured to be large, and conversely, when the particle size distribution is configured to be small, the average equivalent circle diameter of the secondary phase can be configured to be small.

Method of Manufacturing Fuel Cell 10

Next, an example will be described of a manufacture method for the fuel cell 10.

Firstly, a green body for the anode current collector 21 is formed by molding an anode current collector material powder using a die press molding method.

Then, a slurry for the anode active layer is formed by adding PVA (polyvinyl alcohol) as a binder to a mixture of a pore forming agent (for example, PMMA) and the anode active layer material powder. The slurry for the anode active layer is printed onto the green body of the anode current collector 21 using a printing method or the like to thereby form a green body for the anode active layer 22. The green body for the anode 20 is formed as described above.

Next, a slurry for the solid electrolyte layer is prepared by mixing terpineol and a binder with a solid electrolyte layer material powder. The slurry for the solid electrolyte layer is coated onto the green body of the anode active layer 22 using a printing method or the like to thereby form a green body for the solid electrolyte layer 30.

Next, a slurry for the barrier layer is prepared by mixing terpineol and a binder with a barrier layer material powder. The slurry for the barrier layer is coated onto the green body of a solid electrolyte layer 30 using a printing method or the like to thereby form a green body for the barrier layer 40.

Next, the green bodies respectively for the anode 20, the solid electrolyte layer 30 and the barrier layer 40 are fired (1350 to 1450° C., 1 to 20 hours) to form the anode 20, the solid electrolyte layer 30 and the barrier layer 40.

Then, a slurry for the interface region is prepared by mixing water and a binder with a mixed material of a material containing SrO and a perovskite oxide material including at least one of La and Sr at the A site and that is expressed by the general formula $ABO_3$ in a ball mill for 24 hours. At that time, the occupied surface area ratio of the secondary phase in the interface region 52 after firing may be controlled by adjusting the mixture amount of SrO.

Then the slurry for the interface region is coated onto the barrier layer 40 using a printing method or the like to thereby form a green body for the interface region 52. The thickness of the interface region 52 after firing can be controlled to be within 5 μm by adjusting the coating amount of the slurry.

A perovskite oxide material expressed by the general formula $ABO_3$ and including at least one of La and Sr at the A site is mixed with water and a binder in a ball mill for 24 hours to prepare a slurry for the surface region.

Then the slurry for the surface region is coated onto the green body for the interface region 52 to thereby form a green body for the surface region 51.

Then the green body for the cathode 50 is fired (1000 to 1100° C., 1 to 10 hours) to form the cathode 50.

Other Embodiments

The present invention is not limited to the above embodiment, and various changes or modifications may be added within a scope that does not depart from the scope of the invention.

The fuel cell 10 may include provision of a current collector disposed on the cathode 50 (surface region 51). The current collector may be configured as $La_m(Ni_{1-x-y}Fe_xCu_y)_nO_{3-\delta}$. A substance other than La may be contained in the A site of the composition formula, and a substance other than Ni, Fe or Cu may be contained in the B site. The value of m and n is greater than or equal to 0.95 and less than or equal to 1.05, x is greater than or equal to 0.03 and less than or equal to 0.3, y is greater than or equal to 0.05 and less than or equal to 0.5, and $\delta$ is greater than or equal to 0 and less than or equal to 0.8. Although there is no particular limitation on the thickness of the current collector, it may be 30 μm to 500 μm.

Although the fuel cell 10 includes the barrier layer 40, the barrier layer 40 may be omitted. In this configuration, the interface region 52 of the cathode 50 becomes sandwiched between the surface region 51 and the solid electrolyte layer 30.

Although the barrier layer 40 is configured with a monolayer configuration, a laminated structure may be provided in which a dense barrier layer is laminated (randomly) with a porous barrier layer.

EXAMPLES

Although the examples of a fuel cell according to the present invention will be described below, the present invention is not thereby limited to the following examples.

Preparation of Samples No. 1 to No. 12

A fuel cell according to Samples No. 1 to No. 12 was prepared as described below.

Firstly, a mixed powder was prepared by drying a slurry of a mixture of IPA and a blended powder of a pore-forming agent (PMMA), $Y_2O_3$ powder and an NiO powder in a nitrogen atmosphere.

Next, uniaxial pressing (compaction pressure 50 MPa) was applied to the mixed powder to form a plate of 30 mm length×30 mm width and a thickness of 3 mm. A green body for the anode current collector was prepared by further consolidation of the plate by use of a CIP (compaction pressure: 100 MPa).

Next, the slurry formed from a mixture of IPA and a blended powder of PMMA and NiO-8YSZ was coated onto the green body for the anode current collector.

Next, an YSZ slurry was prepared by mixing terpineol and a binder with 8YSZ. Then the YSZ slurry was coated onto the green body of the anode to thereby form a green body for the solid electrolyte layer.

Then a GDC slurry was prepared by mixing terpineol and a binder with GDC, and the GDC slurry was coated onto the green body for the solid electrolyte layer to thereby prepare a green body for the barrier layer.

Next, the green bodies respectively for the anode, the solid electrolyte layer and the barrier layer were fired (1450° C., 5 hours) to form the anode, the solid electrolyte layer and the barrier layer.

Next, a mixture of a material that contains SrO and a perovskite oxide material was prepared as shown in Table 1. At that time, the addition amount of SrO was adjusted in each sample so that the occupied surface area ratio of the secondary phase (SrO) in the cross section of the interface region after firing takes the values shown in Table 1.

Furthermore, the particle size of SrO was adjusted so that the average equivalent circle diameter of the secondary phase takes the values shown in Table 1.

Next, a slurry for the interface region was prepared by mixing terpineol and a binder with the prepared mixed material. The slurry for the interface region was coated onto the barrier layer to thereby prepare a green body for the interface region. At that time, the coating amount of the slurry was adjusted so that the thickness of the interface region after firing takes a value of 5 μm.

Next, a surface region slurry was prepared by mixing terpineol and a binder with the perovskite oxide material shown in Table 1. No addition of a material containing SrO was made to the surface region slurry. The surface region slurry was coated onto the green body of the interface region to thereby prepare the green body for the surface region.

Next, the green body for the surface region and the interface region were fired (1100° C., 1 hour) to form the cathode.

Measurement of Occupied Surface Area Ratio

After polishing of the cathode in each sample with precision machinery, ion milling processing was performed using an IM4000 manufactured by Hitachi High-Technologies Corporation.

Next, a backscattered electron image was acquired at 5 positions in a cross section of the interface region that is enlarged with a magnification of 10,000 times by an FE-SEM using a backscattered electron detector. FIG. 2 is a backscattered electron image of a cross section of the interface region in Sample No. 5.

Then, an analysis image was acquired by analyzing the backscatter electron image for each sample using HALCON image analysis software produced by MVTec GmbH (reference is made to FIG. 3). FIG. 3 shows the secondary phase that is configured by SrO as white.

Then, the proportion of the total surface area of the secondary phase relative to the total surface area of the solid phase in the backscatter electron image was respectively calculated at 5 positions, and the arithmetic average was calculated as the occupied surface area ratio of the secondary phase. The calculation results for the occupied surface area ratio of the secondary phase are shown in Table 1.

Average Equivalent Circle Diameter of Secondary Phase 50 average equivalent circle diameters were calculated in relation to the secondary phase randomly selected from the 5 analysis images used in the calculation of the occupied surface area ratio. The calculation results for the average equivalent circle diameter of the secondary phase are shown in Table 1.

Durability Testing

Samples No. 1 to No. 12 were heated to 750° C. while supplying nitrogen gas to the anode side and air to the cathode side. After reaching a temperature of 750° C., hydrogen gas was supplied to the anode to perform a reduction process for 3 hours.

Next, a voltage drop rate per 1000 hours was measured as a deterioration rate. As an output density, a value was used in which a rated current density value is 0.2 A/cm² at a temperature of 750° C. The measurement results are summarized in Table 1. In the present embodiment, a sample having a deterioration rate of less than or equal to 1.5% was evaluated as having a low deterioration state.

Observation using an electron microscope was made of the cross section of the cathode after durability testing to confirm the presence or absence of cracks in the interface region. In Table 1, a sample confirmed to include cracks of greater than or equal to 5 μm was evaluated as "present", and a sample confirmed to include cracks of less than 5 μm was evaluated as "present (slight)". The observation results are summarized in Table 1.

TABLE 1

| Sample | Main Component of Cathode | Occupied Surface Area Ratio of Secondary Phase (SrO) in Interface Region (%) | Equivalent Circle Diameter of Secondary Phase (SrO) in Interface Region (nm) | Deterioration Rate (%) | Presence of Microscopic Cracks | Evaluation |
|---|---|---|---|---|---|---|
| 1 | (La,Sr)FeO$_3$ | 0.01 | 5 | 2.2 | Yes | X |
| 2 | (La,Sr)(Co,Fe)O$_3$ | 0.03 | 3 | 2.1 | Yes | X |
| 3 | (La,Sr)(Co,Fe)O$_3$ | 0.05 | 5 | 1.4 | Yes (Slight) | ○ |
| 4 | (La,Sr)(Co,Fe)O$_3$ | 0.18 | 10 | 1.1 | No | ◎ |
| 5 | (La,Sr)(Co,Fe)O$_3$ | 0.39 | 78 | 0.1 | No | ◎ |
| 6 | (La,Sr)FeO$_3$ | 0.72 | 111 | 0.2 | No | ◎ |
| 7 | (La,Sr)(Co,Fe)O$_3$ | 1.2 | 160 | 0.3 | No | ◎ |
| 8 | (La,Sr)FeO$_3$ | 1.6 | 260 | 0.5 | No | ◎ |
| 9 | (La,Sr)(Co,Fe)O$_3$ | 2.1 | 320 | 0.8 | No | ◎ |
| 10 | (La,Sr)FeO$_3$ | 2.5 | 500 | 0.9 | No | ◎ |
| 11 | (La,Sr)(Co,Fe)O$_3$ | 3.0 | 620 | 1.5 | Yes (Slight) | ○ |
| 12 | (La,Sr)(Co,Fe)O$_3$ | 3.9 | 700 | 2.6 | Yes (Slight) | X |

As shown in Table 1, the deterioration rate of the cathode was reduced to less than or equal to 1.5%, and the production of microscopic cracks were inhibited in those samples in which the occupied surface area ratio of the secondary phase (SrO) in the interface region was greater than or equal to 0.05% and less than or equal to 3%. This feature is due to the fact that the inactive portion in the interface region can be reduced by configuring the occupied surface area ratio of the secondary phase to be less than or equal to 3%, and furthermore, the improvement to the sintering characteristics of the cathode resulted in a strengthening of the backbone of the porous structure by configuring the occupied surface area ratio of the secondary phase to be greater than or equal to 0.05%.

The production of microscopic cracks in the interface region was further inhibited in those samples in which the average equivalent circle diameter of the secondary phase shown in Table 1 is greater than or equal to 10 nm and less than or equal to 500 nm.

In the present embodiment, although there was an evaluation of the samples in which the surface region did not include a secondary phase, it has been experimentally confirmed that the above effect was obtained even when the surface region includes a secondary phase irrespective of the sizes of the occupied surface area ratio of the secondary phase in a cross section of the surface region.

What is claimed is:

1. A fuel cell comprising:
an anode;
a cathode containing a perovskite oxide of formula (1) as a main component, $$ABO_3 \qquad (1)$$

wherein A includes at least one element selected from the group consisting of La and Sr and B includes at least one element selected from the group consisting of Fe, Co, Mn and Ni; and
a solid electrolyte layer disposed between the anode and the cathode,
wherein the cathode has an interface region that is within 5 μm from the cathode's nearest surface to the solid electrolyte layer and contains a main phase comprising the perovskite oxide and a secondary phase of strontium oxide and an occupied surface area ratio of the strontium oxide in a cross section of the interface region taken parallel to a thickness direction of the cathode is from 0.05-3%.

2. The fuel cell according to claim 1, wherein an average equivalent circle diameter of the strontium oxide in the cross section of the interface region is from 10 to 500 nm.

* * * * *